United States Patent [19]

Walker et al.

[11] Patent Number: 4,537,933

[45] Date of Patent: Aug. 27, 1985

[54] BLENDS OF POLYOLEFIN GRAFT POLYMERS AND ASA POLYMERS

[75] Inventors: Leigh E. Walker, Lewiston; Gautam R. Ranade, Grand Island, both of N.Y.

[73] Assignee: Occidental Chemical Corporation, Niagara Falls, N.Y.

[21] Appl. No.: 541,399

[22] Filed: Oct. 12, 1983

[51] Int. Cl.$^3$ .................. C08L 51/04; C08L 51/06; C08L 27/06

[52] U.S. Cl. ......................................... 525/71; 525/75; 525/72; 525/76; 525/85

[58] Field of Search .................. 525/71, 75, 76, 85, 525/290

[56] References Cited

U.S. PATENT DOCUMENTS

| | | | |
|---|---|---|---|
| 3,644,577 | 2/1972 | Lee et al. | 525/71 |
| 3,780,134 | 12/1973 | Lonning | 525/71 |
| 3,789,083 | 1/1974 | Dumoulin et al. | 260/878 |
| 3,970,718 | 7/1976 | Takahashi et al. | 525/76 |
| 4,014,842 | 3/1977 | Kosugi et al. | 525/74 |
| 4,054,615 | 10/1977 | Hardt et al. | 525/290 |
| 4,071,582 | 1/1978 | Takahashi | 525/310 |
| 4,111,876 | 9/1978 | Bailey et al. | 524/521 |
| 4,173,596 | 11/1979 | De Witt | 525/71 |
| 4,195,137 | 3/1980 | Walker | 525/290 |
| 4,276,391 | 6/1981 | Hardt et al. | 525/71 |

FOREIGN PATENT DOCUMENTS 1158636  7/1969  United Kingdom .

*Primary Examiner*—Carman J. Seccuro
*Attorney, Agent, or Firm*—James F. Tao; James F. Mudd

[57] ABSTRACT

A novel thermoplastic polymer composition comprises a blend of a polyolefin graft polymer and a copolymer of acrylonitrile and styrene modified with a base polymer such as an acrylic polymer, a chlorinated polyethylene, or a terpolymer of styrene, acrylonitrile and a polyene modifier.

24 Claims, No Drawings

BLENDS OF POLYOLEFIN GRAFT POLYMERS AND ASA POLYMERS

BACKGROUND OF THE INVENTION

The present invention relates to thermoplastic polymer blends capable of being molded into plastic articles with improved properties. The polyblends of the present invention contain a graft copolymer of a polymerizable polyolefin component. Such copolymers are hereinafter referred to as "polyolefin graft copolymers". In a preferred embodiment of the invention, the polymerizable monomer is a vinyl halide, such as vinyl chloride, and up to about 50 weight percent of another copolymerizable monomer. The preferred embodiments will be referred to as "vinyl halide-graft polyolefin polymers". The present blends also contain a polymer composition hereinafter referred to as "ASA polymers".

Polyvinyl halide especially polyvinyl chloride, polymer are widely used thermoplastic materials having many favorable properties. Such conventional nongraft vinyl halide polymers do not have heat distortion temperatures which are sufficiently high to adapt such polymers to much more wide use. Moreover, such polymers, especially rigid polyvinyl halide polymers, do not have a high impact resistance at ambient or sub-ambient temperatures. Thus, at ambient temperature, i.e., at about 20° C., corresponding to about 68° F., the notched Izod impact resistance of vinyl haldide homo- and copolymers is only of the order of about 0.4 to less than about 1 ft-lb/in. At sub-ambient temperatures, e.g., down to −20° F. or lower, the notched Izod impact resistance of these polymers becomes vanishingly small or negligible.

It has been previously proposed to add minor amounts of an appropriate polymer additive, or additives, to improve ambient impact resistance of conventional polyvinyl polymer compositions. Usually, such additives are useful in ranges from about 3 to about 15 percent by weight of the polyvinyl halide polymer. Among the materials which have been found acceptable as polyvinyl halide impact modifiers are ABS polymers. Such impact modifiers moderately enhance the ambient temperature impact resistance of conventional vinyl halide polymers, i.e., generally raise the ambient temperature notched Izod impact resistance of the polymer to about 2 to 10 ft-lbs./in. However, these impact modifier are relatively ineffective in imparting a satisfactory sub-ambient temperature impact resistance to the polymer, i.e., the −20° F. notched Izod impact resistance of the polymer containing the impact modifier is well below 1 ft-lb/in and usually is about 0.4 to 0.5 ft-lb/in.

Recently, vinyl halide-polyolefin graft copolymers have been developed to be a commercial reality. Such copolymer are produced by polymerization of vinyl halide (or a monomer mixture of vinyl halide and copolymerizable ethylenically unsaturated comonomers) in the presence of a polyolefin elastomer. Such reaction yields a polymer product which contains vinyl halide polymer chains bound, i.e., grafted at various sites along the chain of the trunk olefin polymer, as well as ungrafted vinyl halide polymer and ungrafted polyolefin. The graft polymer product, especially the graft polymer product prepared by a liquid phase bulk polymerization reaction, has improved impact resistance at both ambient temperature and sub-ambient temperatures compared to the aforementioned conventional, i.e., ungrafted, vinyl halide polymers even when the latter are blended with a conventional polyvinyl halide impact modifying polymer additive. The bulk polymerization-prepared graft polymer product is even distinguished from the corresponding graft polymer prepared by a non-bulk polymerization technique, e.g., suspension polymerization, by an enhanced impact resistance at both low and ambient temperature and by breakage by the desirable ductile breakage mode rather than by an undesirable brittle breakage mode.

Although such graft polymer possesses a sub-ambient low temperature impact resistance substantially greater than that of conventional impact modifier-containing vinyl halide polymer compositions, the improvement, especially at low temperature, in impact resistance is not sufficient enough to make such copolymers generally useful in a wide variety of applications at low temperature.

It has now been found that blends containing (1) a polyolefin graft polymer, prepared in a new way, especially vinyl halide polyolefin graft polymers, and more especially those produced in a mass polymerization reaction, and (2) ASA polymers have particularly useful properties.

The molecular miscibility exhibited by the matrix phases of these polymeric components of the invention offers several advantages. The miscibility provides excellent mechanical compatibility. Superior weld line strengths and improved surface properties can be obtained when a miscible polymer blend is used. A problem of possible deterioration of the properties due to phase separation during or after processing may exist for a immiscible blend. This is likely in case of the injection molding process which typically uses very high shear rates. This problem is unlikely in the case of a miscible polymer system. Also, an efficient heat distortion enhancement per unit weight of the added polymer can be usually obtained compared to the immiscible systems. Preferential segregation of additives associated with components of a polymer blend can occur. This problem is generally avoided with miscible blends.

SUMMARY OF THE INVENTION

The present invention relates to a thermoplastic polymer composition which is comprised of a blend of a polyolefin graft polymer and an ASA polymer. The polyolefin graft polymer is a polymer of an ethylenically unsaturated polymerizable monomer and a polymer of an olefin of 2 to about 8 carbon atoms, prepared in a process wherein the olefin polymer is substantially insoluble in the monomer, but is capable of absorbing the monomer.

Another aspect of the invention relates to a thermoplastic polymer composition which is comprised of a blend of a vinyl halide polyolefin graft polymer and an ASA polymer. The vinyl halide polyolefin graft polymer is a product of a solid polyolefin particle comprising a polymer of an olefin of 2 to about 8 carbon atoms, preferably a polyolefin of an aliphatic hydrocarbon olefin of 2 to about 8 carbon atoms with a vinyl halide monomer either alone or in combination with up to 50 percent by weight based on the total weight of monomer of an ethylenically unsaturated compound copolymerizable therewith. The olefin polymer is substantially insoluble in the monomer, but is capable of absorbing the monomer.

Both the polyolefin graft copolymer and the vinyl halide-polyolefin graft polymer are prepared by reacting polyolefins in a proportion of about 20 to about 80 weight percent based on the weight of the reactive monomer, although higher and lower proportions can be used. The preferred proportion is about 30 to about 50 weight percent of polyolefin based on weight of the monomer. The foregoing polyolefin graft polymers are advantageously prepared in a mass polymerization process, but can also be prepared in the presence of an inert diluent such as water.

By ASA polymer is meant a polymer of styrene and acrylonitrile that is modified by blending with or reaction with an acrylate polymer, a chlorinated polyethylene, or an olefin-diolefin modified polymer such as an ethylene propylene polyene modified polymer. Such ASA polymers are found to be highly miscible with the vinyl halide-polyolefin graft polymers.

The blends of this invention have beneficial properties when compared to prior art blends.

A further aspect of this invention involves blends of the foregoing polyolefin graft polymers, ASA polymers and graft polymers and copolymers of the polymerizable monomers that can form part of the polyolefin graft polymers. A preferred aspect of this invention involves blends of vinyl halide polyolefin graft polymers, ASA polymers and a polymer of a vinyl halide alone or copolymerized with a polymerizable monomer.

DETAILED DESCRIPTION OF THE INVENTION AND THE PREFERRED EMBODIMENTS THEREOF

Proportions of the ASA polymer in a binary blend with the polyolefin graft polymer, can range typically from less than about 1 percent to more than about 99 weight percent of ASA polymer (with the balance being the graft polymer component). It is preferred to provide blends which contain about 5 percent up to about 80 percent of the polyolefin graft polymer to achieve the desired enhanced properties. Preferred blends of this aspect of the invention contain about from about 5 percent to about 50 percent of the graft polymer component and from about 50 percent to about 95 percent of the ASA polymer component, said percentages being based on the weight of the blend of the graft polymer and the ASA polymer.

With respect to the aspect of the invention involving not only the graft polymer components and the ASA polymer component, but also an auxiliary polymer comprising a polymer or copolymer of an ethylenically unsaturated polymerizable monomer, the proportions of components are in the following ranges. The ASA polymer component is generally present in a proportion of about 20 percent to about 80 percent of the total polymer components, with the remainder being the polyolefin graft copolymer and the auxiliary polymer component. The latter two components are generally present in the proportion of about 10 parts polyolefin graft polymer to 90 parts auxiliary polymer to about 90 parts polyolefin graft polymer to 10 parts auxiliary polymer. The range is preferably from about 20 parts polyolefin graft polymer to 80 parts auxiliary polymer to 40 parts auxiliary polymer to about 30 parts polyolefin graft polymer to 60 parts auxiliary polymer. All parts and percentages are by weight.

THE POLYOLEFIN GRAFT POLYMER COMPONENT

The component of the polymer blends of the invention is a graft polymer of an ethylenically unsaturated polymerizable monomer and a polymer of an olefin of 2 to about 8 carbon atoms, wherein the olefin polymer is substantially insoluble in the monomer but is capable of absorbing the monomer. Such polymers and the process for making them are described in copending application Ser. No. 541,191, filed on even date herewith, the disclosure of which is incorporated herein by reference.

MONOMER COMPONENT

The novel graft polymers of the invention are prepared from one or more ethylenically unsaturated compounds that is polymerizable in the presence of a free-radical initiator. Suitable ethylenically unsaturated compounds which can be used are illustrated by the following compounds. Monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear alpha-alkyl or aryl substituted derivatives, e.g., o-, m- or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, allyl alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate, ethyl alpha-iodoacrylate; alkyl alpha-cyanoacrylates, e.g., methyl alpha-cyanoacrylate and ethyl alpha-cyanoacrylate, maleates, e.g., monomethyl maleate, monoethyl maleate, dimethyl maleate, diethyl maleate, and fumarates, e.g., monomethyl fumarate, monoethyl fumarate, dimethyl fumarate, diethyl fumarate, and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, famaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl betachloroethyl sulfide, vinyl betaethoxyethyl sulfide and the like can also be included as can diolefinically unsaturated hydrocarbons containing two olefinic groups in conjugated relation and the halogen derivatives thereof, e.g., butadiene-1,3; 2-methyl-butadiene1,3; 2,3-dimethyl-butadiene-1,3; 2-methyl-butadiene-1,3 2,3-dimethyl-butadiene1,3; 2-chloro-butadiene-1,3; 2-3-dichloro-butadiene-1,3; and 2-bromobutadiene-1,3 and the like. Mixtures of the foregoing compounds can also be employed.

Particularly useful monomer compositions include styrene, methyl methacrylate, methyl acrylate, vinyl acetate, mixtures of styrene and acrylonitrile, and mixtures of styrene and various maleates.

On one aspect of the invention, the preferred monomer composition is comprised totally of a vinyl halide monomer. Suitable vinyl halide monomers useful in the invention are the alpha-halo-substituted ethylenically unsaturated compounds which are capable of entering into an addition polymerization reaction, for example vinyl monohalides such as vinyl fluoride, vinyl chloride, vinyl bromide, and vinyl iodide, as well as vinyl dihalides such as vinylidene fluoride, vinylidene chloride, vinylidene bromide, and vinylidene iodide and the like, although vinyl chloride is preferred.

While it is preferred that the monomer composition be comprised totally of vinyl halide monomer as described above, the present invention is also intended to include copolymers formed by the free-radical addition polymerization of a monomer composition containing a predominant amount, e.g., at least 50 percent of vinyl halide with the remainder being another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

POLYOLEFIN COMPONENT

The polyolefin component of the invention is characterized by being substantially insoluble in the reactive monomer component, and it remains insoluble during the polymerization reaction. The polyolefin is also capable of absorbing the reactive monomer component. When the proportion of polyolefin in the reaction mixture is at least about 20 weight percent of the reactive components, essentially all of the monomer component is absorbed into the particles of polyolefin component where the reaction occurs.

Generally, the polyolefin is capable of absorbing monomer to the extent of at least about 10 weight percent of the weight of polyolefin, usually at least about 25 weight percent and more usually at least about 100 weight percent of the weight of polyolefin. Generally, the polyolefin can absorb monomer up to 10 times the weight of polyolefin, more usually up to about 400 weight percent and still more usually up to 300 weight percent of the weight of polyolefin. The polyolefin may swell in the presence of the monomer. But the polyolefin remains as a free flowing particle that does not agglomerate or fuse.

The preferred polyolefins are prepared from unsubstituted, aliphatic hydrocarbon monoolefins, including straight chain and branched chain compounds such as ethylene, propylene and butene-1, isobutene, pentene, hexene, heptane, octene, 2-methylpropene-1, 3-methylbutene-1, 4-methylpentene-1, 4-methylhexene-1, and 5-methylhexene-1.

The polyolefin also preferably contains an unsubstituted, aliphatic hydrocarbon polyene, such as diene or triene, as a monomer unit. Generally polyenes of from 5 to 18 carbon atoms are employed.

Suitable comonomers for preparing the polyolefins are those utilized to prepare homopolymers as listed above such as propene or butene-1 with ethene or isobutylene with isoprene and the like. Suitable termonomers are those utilized to prepare homopolymers and copolymers as disclosed above such as propene, ethene and the like containing up to 15 percent, preferably up to about 10 percent by weight of polyene, for example, a diene such as dicyclopentadiene, 1,3-butadiene, 1-5-cyclooctadiene, 2-ethylidene-norbornene-5, 1,4-hexadiene, 1,4-heptadiene, and other conjugated and especially non-cojugated dienes with linear or cyclic chains.

Trienes such as isopropylidene cyclopentadiene and the Diels-Alder mono- and di-adducts thereof with cyclopentadiene can be used in place of the diene.

Unsubstituted, aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

Various other polyolefins that contain other than hydrogen and carbon can also be employed as long as they meet the criteria of being insoluble in the reactive monomer and capable of absorbing that monomer. Such polyolefins are generally polymers of substituted, aliphatic hydrocarbon olefins of 2 to about 8 carbon atoms, and are more particularly polymers of an unsubstituted, aliphatic hydrocarbon olefin of 2 to about 8 carbon atoms and a substituted, aliphatic hydrocarbon olefin of 2 to about 8 carbon atoms. Suitable substituted hydrocarbon olefins include vinyl acetate, vinyl benzoate, and other vinyl esters with organic acids and haloacids, isopropenyl acetate and other esters, methyl methacrylate and other alkyl methacrylates, methyl acrylate, ethyl acrylate and other alkyl acrylates, and olefins. Included in such additional polyolefins are olefin-vinyl acetate copolymers, such as ethylene-vinyl acetate copolymers; olefinacrylate copolymers, such as ethylene-acrylate copolymers; polychlorobutadiene, and the like.

Suitable polyolefin components include the above described homopolymers, copolymers or terpolymers, but can also include blends of two or more polyolefins that may not meet the criteria in themselves, but the blended composition is insoluble in the reactive monomer but capable of absorbing the reactive monomer. Thus, certain ethylene propylene diene modified polymers (EPDM) are soluble in vinyl chloride monomer, and hence are not suitable when used alone in the process of the invention. High density polyethylene (HDPE) is insoluble in vinyl chloride monomer, but does not absorb that monomer, and hence is not suitable when used alone in the process of the invention. However, it is found that mixtures of ethylene propylene diene modified polymers and high density polyethylene when melt blended are highly desirable in the process of the invention. The higher the ethylene content of the EPDM, the lower the amount of HDPE required. Particularly suitable are HDPE's having a melt index of 0.1 to 50, blended with a polyolefin, for example, EPDM at a ratio of from 1 to 20 to 20 to 1.

Low density polyethylene is found to be both insoluble in vinyl chloride monomer and capable of absorbing that monomer, and is useful in the process of the invention. The very low density polyethylene waxes, on the other hand, are soluble in vinyl chloride monomer and hence are not suitable when used alone in the process of the invention. Other useful blends of polyolefins include blends of polybutadiene and high density polyethylene. Very high molecular weight polymers, e.g. polybutadiene of weight average molecular weight of over 1,000,000, or ethylene propylene copolymer of weight average molecular weight over 300,000, function in this manner without blending in reactions where their lower homologs may need to be blended to meet the nonsolubility requirement. A given blend or polymer may perform with one monomer where the insolubility requirement is met, but not in another where it dissolves, or partially dissolves. The former would be considered to be within the scope of the invention whereas the latter would not.

The polyolefin used in the invention is in particulate form. The particles may be pellets, such as formed by extrusion through an orifice and cutting into pellets by a dicer. The particles can also be formed as pellets in a pellet forming device. The polyolefin is generally in the form of particles measuring in the range of about 1 to about 5 millimeters, preferably about 1 to about 3 millimeters. Other particle sizes can be used. The particles can be of various shapes, uniform such as beading cylinders, pill shaped, as well as in irregular shapes resulting from grinding.

REACTION CONDITIONS

The polyolefin graft polymer component of the invention is preferably prepared in a mass polymerization process wherein solid discrete particles or pellets of solid polyolefin are mixed with a monomer component in the liquid state and a free-radical initiator compound at ambient temperatures. All or part of the mixture of monomer and initiator compound is absorbed into the solid polyolefin particles.

It is preferred to put all the monomer into the reactor with the polyolefin at the beginning of the reaction. However, the monomer can be added incrementally during the reaction. As indicated hereinbefore, the monomer can be reacted with the polyolefin in steps to achieve the desired product. Generally only sufficient monomer is introduced at one time to the polyolefin to avoid the formation of powdered polymer, except, of course, in the aspect of the invention where co-manufacture of particles of graft polymer and powdered homopolymer or copolymer is desired. When operating in the stepwise embodiment, the amount of monomer added in the second and subsequent steps does not usually exceed the ratio of monomer to polyolefin established in the first step of the sequence.

The reaction mixture is heated to a temperature in the range of about 30 to about 90 degrees Celsius, preferably in the range of about 40 to about 75 degrees Celsius, more preferably in the range of about 60 to about 70 degrees Celsius, and the reaction is allowed to proceed to the desired conversion of monomer, generally in the range of about 30 to 90 percent conversion, preferably about 50 to 80 percent conversion, and more preferably about 60 to 75 percent conversion. Thereafter, the unreacted monomer component is removed from the reaction mixture by suitable degassing techniques such as by direct degassing, by drawing a vacuum on the reaction product, by washing with water or a solvent or by steam distillation. The solid reaction product is withdrawn from the reaction vessel as the product of the process.

INITIATORS

Suitable initiator compounds for use in the process of the invention include organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Suitable initiators are soluble in the organic phase, such as peroxides: benzoyl peroxide, capryl peroxide, lauroyl peroxide, 2,4-dichlorobenzoyl peroxide, diacetyl peroxide, and acetyl cyclohexylsulfonyl peroxide; azo compounds: azobisiobutyronitrile, azobis(alphamethyl gammacarboxybutyronitrile), azobis(alphagamma-dimethylvaleronitrile), 2,2'-azobis(2,4-dimethylvaleronitrile); peroxydicarbonates: diiopropyl peroxydicarbonate disecbutyl peroxydicarbonate, and dicyclohexylperoxydicarbonate, azobiciobutyramidine hydrochloride, and peresters: t-butyl peroxypivalate and t-butyl peroxyneodecanoate. Peroxydicarbonates, peresters and peroxides are particularly useful in the present invention. The initiator is used in concentration ranging from about 0.01 to about one percent by weight, preferably about 0.1 to about 0.5 percent by weight, based on the total weight of the monomers. Other amounts can be used.

DILUENTS

Various diluents may be used in the process of the invention as long as they are not reactive with the products of the invention and do not dissolve the products of the invention, which would partially defeat many of the virtues of the process. The most common diluent is water, which may be used without any suspending or emulsifying agent. Essentially, when water is used as the diluent, the particles of solid polyolefin float in the water phase and during the reaction process are dispersed through the water phase by suitable agitation.

Other diluents include organic compounds such as saturated hydrocarbons having from about 3 to about 15 carbon atoms per molecule. Preferably, the diluent is a straight or branched chain, or cyclic saturated hydrocarbon having from 3 to 15 carbon atoms, and more preferably, from 4 to 8 carbon atoms. Alcohols of 1 to 15 carbon atoms can also be employed.

Illustrative examples of suitable diluents which can be employed in the present process include n-propane, n-butane, isobutane, isopentane, reopentane, 2-methyl pentane, 3-methyl pentane, 2,2-trimethyl pentane, 2,2,3-trimethyl pentane, n-tridecane and n-pentadecane. Mixtures of these and other hydrocarbon alkanes, as well as cycloalkanes, such as cyclohexane and methyl cyclopropane, can be used also. Useful alcohols include ethyl, isopropyl, butyl, isobutyl, octyl, dodecyl alcohol, ethylene glycol, propylene glycol, 1,3-dihydroxypropane, and the like.

The diluents can enter the polyolefin particles as in the case of hydrocarbons, or may stay out as in the case of water, or may do both.

CHAIN TRANSFER AGENTS

Chain transfer agents can be used in the process of the invention to adjust the molecular weight of the polymer of the unsaturated monomer, such as PVC. The polyolefin component itself is found to serve as a chain transfer agent by changing the molecular weight of the PVC produced in the case of vinyl chloride monomer. Other transfer agents that can be used include aldehydes, mercaptans such as mercaptoethanol, dodecylmercaptan; chloroolefins such as perchloroethylene, trichloroethylene, halomethanes such as bromoform, olefins, substituted isopropyl compounds, thiotin compounds, such as alkyltin mercaptoacetate esters and the like.

THE ASA POLYMER COMPONENT

The ASA polymer is a polymer of styrene and acrylonitrile (often referred to in the trade as a SAN polymer) that is modified with an acrylate polymer or a chlorinated polyethylene or a terpolymer of ethylene, propylene and a non-conjugated diene. Generally the styrene and acrylonitrile components are reacted with the acrylate polymer or the chlorinated polyethylene.

One such suitable ASA polymer is disclosed in U.S. Pat. No. 4,111,876, the disclosure of which is incorporated herein by reference. In accordance with the patent, a preferred ASA polymer is prepared by an improved process which comprises: introducing at least one primary polymerizable feed composition, selected from the group of monomers consisting of styrene, acrylonitrile, acrylate ester, and a mixture of two or more of such monomers, from at least one primary feed source to a polymerization zone, the primary polymerizable feed composition continually varying in compositional content of the polymerizable reactants therein during the continuous introductions; simultaneously adding to the primary feed source at least one different second polymerizable feed composition, selected from the group of monomers consisting of styrene, acrylonitrile, acrylate ester and a mixture of two or more of such monomers, from at least one secondary feed source so as to continually change the compositional content of the polymerizable reactants of the primary polymerizable feed composition in the primary feed source; and continuously polymerizing the primary polymerizable feed composition introduced to the polymerization zone until desired polymerization has been achieved. The primary polymerizable feed composition being different from the secondary polymerizable feed composition. The polymerization is preferably conducted under monomer starved conditions. The weight ratio of acrylonitrile to styrene is preferably about 1 to 3 in a clear or transparent ASA polymeric material.

Any of the known acrylate esters can be used. While the preferred acrylate ester is 2-ethylhexyl acrylate, other lower alkyl acrylates having 2 to 12, preferably 4 to 10, carbon atoms in the alkyl group, such as, ethyl acrylate, isopropyl acrylate, propyl acrylate, n-butyl acrylate, hexyl acrylate, dodecyl acrylate, 3-methyl-1-butyl acrylate, isobutyl acrylate and isodecyl acrylate, can be used.

Styrene and acrylonitrile provide a hard matrix component and the acrylonitrile, styrene and acrylate ester provide the rubber or elastomeric segment. The preferred ratio of acrylonitrile to styrene is in the range of 1 to 3. The hard matrix acrylonitrile-styrene (AS) to elastomer weight ratio in the ASA should be in the range of between 40 to 60 and 60 to 40.

A commercially available embodiment of this ASA polymer was found to have a composition of 56 percent styrene, 15.2 percent acrylonitrile and 28.8 percent acrylate polymer, all percentages by weight.

Another suitable ASA polymer is disclosed in U.S. Pat. No. 4,151,226, the disclosure of which is incorporated herein by reference. This ASA polymer is prepared by graft copolymerizing in the presence of a watersoluble polymer and a radical polymerization initiator in an aqueous medium, 90 to 60 part by weight of a monomer mixture comprising 30 to 100 percent by weight of an aromatic vinyl compound, such as styrene, and 0 to 70 percent by weight of an acrylonitrile component in which the proportion of acrylonitrile is 20 to 100 percent by weight with the remainder being methylmethacrylate. This monomer mixture is copolymerized in the presence of 10 to 40 parts by weight (in terms of solids content) of a rubbery copolymer latex obtained by copolymerizing in a aqueous emulsion a mixture comprising (1) 60 to 99.9 percent by weight of at least 1 alkyl acrylate such as butyl acrylate, having 1 to 13 carbon atoms in the alkyl group, (2) 0 to 20 percent by weight of at least one vinyl compound copolymerizable with (1), such as styrene, and (3) 0.1 to 20 percent by weight of at least one organic polyallyl compound copolymerizable with component (1), such as triallyl isocyanurate. In the polymerization process, the reaction system is subjected to a mechanical mixing treatment by means of, for example, an ordinary agitator, homogenizer or colloid mill and then conducting the graft copolymerization.

The preferred aromatic vinyl compound is styrene. However, various vinyl aromatic monomer can also be employed such as alkyl styrenes such as p-methyl styrene, ethylstyrene, isopropyl styrene, p-tertiary butyl styrene, and the like; halogen substituted styrenes such as chlorostyrene and dichlorostyrene, and the like.

Suitable alkyl acrylates are those which contain an alkyl group having 1 to 13, preferably 4 or less, carbon atoms. Specific acrylates include 2-ethylhexyl acrylate, ethyl acrylate, isopropyl acrylate, propyl acrylate, n-butyl acetate, hexyl acrylate, dodecyl acrylate, 3-methyl-1-butyl acrylate, isobutyl acrylate and isodecyl acrylate.

The organic polyallyl compounds used in preparing the rubber copolymer act as a crosslinking agent for the acrylic ester, and provide grafting active sites in the graft copolymerization, whereby favorable results are obtained. Such effects result from the fact that the allyl group is very easily reacted with a radical, which enables the effective cross-linking reaction in polymerization into the rubbery copolymer. Further, the remaining allyl groups provide effective grafting active sites in the graft copolymerization, since a radical chain transfer to the residual allyl groups easily takes place. The organic polyallyl compounds used include triallyl cyanurate, trially isocyanurate, diallyl phthalate, diallyl isophthalate, diallyl terephthalate, triallyl trimellitate, diallyl trimellitate tetraallyl pyromellitate triallylpyromellitate, diallyl pyromelitate, diallyl maleate, diallyl fumarate, diallyl adipate, etc., whereas those organic polyallyl compounds which are unable to copolymerize with an acrylic ester, such as triallylamine, diallylamine, and diallyl sulfide are, of course, excluded from the scope of this invention. The amount of the organic polyallyl compound used should be such that 0.1 to 20 percent, preferably 0.5 to 10 percent, by weight of the compound based on the total weight of the monomer mixture. When the amount is less than 0.1 percent by weight, the polyallyl compound cannot show a sufficient crosslinking effect, and when the amount is more than 20 percent by weight, it adversely affects the rubber elasticity. The organic polyallyl compounds may be used alone or in combination of two or more.

In the polymerization into the rubbery copolymer (A), a part of the alkyl acrylate may be replaced by at least one vinyl compound copolymerizable with the acrylic ester, such as, for example, styrene, acrylonitrile, or methyl methacrylate. In such a case, the proportion of the vinyl compound is 30 percent by weight or less, preferably 20 percent by weight or less based on the total weight of the monomer mixture.

This ASA polymer is produced in accordance with processes and additives such as initiators, emulsifiers, and the like, disclosed in the aforesaid U.S. Pat. No. 4,151,226.

A commercial embodiment of this ASA polymer comprises 58.4 percent of styrenic monomer, 23.3 percent acrylonitrile and 18.3 percent acrylic polymer, all percentages being by weight.

Another suitable ASA polymer is disclosed in U.S. Pat. No. 3,953,540, the disclosure of which in incorporated herein by reference. Such products comprise acrylonitrile, styrene and chlorinated polyethylene. Included are the graft type resins which are obtained by copolymerizing a chlorinated polyethylene with a mixture of acrylonitrile and styrene, (b) the blend type resins which are obtained by mixing a chlorinated polyethylene with an acrylonitrile-styrene copolymer, and (c) the graft-blend resin which is obtained by mixing the foregoing graft type resin with an acrylonitrile-styrene copolymer. Also included are such resins in which methyl methacrylate is substituted for a part of the acrylonitrile, as well as those in which alpha-methylstyrene is substituted for a part of the styrene. Suitable chlorinated polyethylenes are those obtained by chlorinating a polyethylene of an average molecular weight of above 50,000 and preferably above 100,000, and in addition, those obtained by chlorinating ethylene copolymers such as ethylene-propylene or ethylenebutene-1, as well as polymers obtained by chlorosulfonating polyethylene.

In the foregoing polymers, the chlorinated polyethylene is present in an amount from about 25 to 35 percent by weight, and the degree of chlorination of the chlorinated polyethylene is about 30 to about 45 percent by weight. The ratio of acrylonitrile to styrene is preferably in the range of 1:99 to 50:50.

One commercially available ASA polymer of this type contains 40.8 percent styrene, 14.9 percent acrylonitrile and 44.3 percent chlorinated polyethylene, all percentages by weight. Another commercially available ASA polymer of this type contains 52.1 percent styrene, 13.1 percent acrylonitrile and 34.7 percent chlorinated polyethylene, all percentages by weight.

Another ASA polymer comprises a graft terpolymer of ethylene and propylene and a non-conjugated diene, which terpolymer is copolymerized with a mixture of styrene and acrylonitrile, and preferably mixed with a copolymer of acrylonitrile and styrene. Such ASA polymers are disclosed in U.S. Pat. Nos. 3,489,821 and 4,166,081, the disclosures of which are incorporated herein by reference. The graft copolymer is made by polymerizing a resinforming monomer or a mixture of such monomers, in the presence of a rubbery copolymer resulting from the copolymerization of a monomer mixture comprising two or more alpha-monoolefins, with or without a minor proportion of a diolefin. If a diolefin is used, the amount should be so limited that the rubbery copolymer has an iodine number not greater than about 20. This will generally correspond to no more than about 10 percent by weight of diolefin monomer units in the copolymer.

The alpha-monoolefins used to make any rubbery copolymer are those having the formula $CH_2=CHR$, in which R may be hydrogen or a saturated alkyl radical such as methyl, ethyl, n-propyl, isopropyl and the like. Preferred rubbery copolymers are those in which the alpha olefins used are ethylene or propylene, the weight ratio of ethylene monomer units to propylene monomer units in the copolymer being from 20/80 to 80/20, preferably between 35/65 and 65/35.

Diolefins suitable for use in making the rubbery copolymers are non-conjugated straight-chain or cyclic diene hydrocarbons which are copolymerizable with the alpha-monoolefins. Examples of suitable diolefins are straight or branched chain diolefins, such as those in which both double bonds are terminal as in 1,4-pentadiene, 1,5-hexadiene, 2-methyl-1,5-hexadiene, 3,3-dimethyl-1,5-hexadiene, 1,7-octadiene, 1,9-decadiene, 1,19-eicosadiene, and the like; diolefins in which only one double bond is terminal such as 1,4-hexadiene, 1,9-octadecadiene, 6-methyl-1,5-heptadiene, 7-methyl-1,6-octadiene.

The graft copolymer is formed by reacting acrylonitrile and styrene with the diolefins just described by methods set forth in the aforesaid U.S. Pat. No. 3,489,821 and U.S. Pat. No. 4,166,081.

The preferred ASA polymer made according to this method is a blend of such a graft copolymer with a copolymer of styrene and acrylonitrile.

The relative amounts of resin and rubbery component in the compositions are defined as the resin-to-rubber ratio, which is the ratio of the total amount of resinous material in the composition (i.e., in the graft copolymer) to the amount of copolymer rubber (i.e., the rubbery spine or base polymer used in making the graft copolymer). Thus a mixture of 50 parts of resin with 50 parts of a graft copolymer of 25 parts of resin-forming monomer on 25 parts of rubber would have a resin-to-rubber ratio of 75:25. The resin-to-rubber ratio may vary from about 60:40 to about 95:5, depending upon the particular resingraft polymer system in question, and upon the properties desired in the product. Increasing rubber content gives increasing impact strength, with some decrease in rigidity and hardness. For most purposes, the best rubber-to-resin ratio will be in the range 70:30 to 90:10.

A commercially available ASA polymer in accordance with this aspect of the invention contains 51 percent styrene, 26 percent acrylonitrile and 23 percent EPDM rubbery copolymer.

In preparing the ASA polymers, any of the vinyl aromatic compounds disclosed herein may be employed. Unsaturated nitriles that can be employed include acrylonitrile, as well as alkyl substituted acrylonitrile such as methacrylonitrile.

AUXILIARY POLYMER COMPONENT

In addition to binary blends of the polyolefin graft polymer component and the ASA polymer component, highly useful compositions can be proposed by blending in as an auxiliary component, a polymer or copolymer of an ethylenically unsaturated polymerizable compound. Such polymerizable compounds use any of those disclosed hereinabove for preparation of the polyolefin graft polymers.

When the polyolefin graft polymer is a vinyl halide polyolefin graft polymer, it is highly desirable for the auxiliary polymer component to be a vinyl halide homopolymer or copolymer with a copolymerizable ethylenically unsaturated monomer. The vinyl halide monomers and the comonomers are any of those described hereinbefore.

OPTIONAL ADDITIVES

The compositions of the invention can also contain various functional additives which additives are conventional in the preparation of polymer molding compositions. Typically, these additives include thermal and/or light stabilizers as well as external and internal lubricants and processing aids for the polyolefin graft polymer component and the other polymers of the blends of the invention.

Stabilizers suitable for use in making the polymer compositions of the invention include materials known to stabilize the polymer components against the degradation action of heat and/or light. They include known stabilizers, both organic and inorganic, such as metal salts of mineral acids, salts of organic carboxylic acids, e.g., carboxylic acids of 6 to 18 carbon atoms, organo-tin compounds, epoxides, amine compounds and organic phosphites. Conveniently, an organo-tin compound, such as a methyl tin mercaptide, is employed as a stabilizer.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polymers which can be added optionally to the compositions of the invention in addition to the aforementioned stabilizers, lubricants and processing aids include pigment, dyes and fillers as described in L. R. Brecker, *Plastics Engineering*, March 1976, "Additives 76", pages 3-4, the disclosure of which is incorporated herein by reference.

In general, the amount of each type of the aforementioned optional additive employed in the present composition is about 0.01 to about 5 weight percent, preferably about 0.1 to about 3 weight percent, based on the total resin composition.

When the compositions of the invention contain vinyl halide polymer components, they are essentially of the rigid vinyl halide resin type which contain no more than about 10 weight percent of a plasticizer for vinyl halide grade polymer and preferably are free of said plasticizing additive. Typical suitable plasticizer additives (which are generally organic compounds) conventionally employed in polyvinyl halide compositions include, for example, the esters of aliphatic alcohols of medium chain length, of 7 to about 11 carbon atoms, with phenyl dicarboxylic acids, such as di-n-octyl phthalate and di-iso-nonyl phthalate as well as organic phosphate esters, such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

PREPARATION OF BLENDS

The compositions of the invention can be prepared by conventional milling and molding techniques. Generally, the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as a product from the milling and mixing operation is molded by either an injection or compression molding technique or extruded to produce articles of particular desired shapes at elevated temperature and pressure conditions which are conventional in molding rigid polyvinyl halide compositions. Desirably an injection molding technique is employed to prepare the aforementioned articles which can be in various shapes including bars, plates, rings, rods, as well as sheets and films. Physical or chemical blowing agents can also be added to the moulding compounds according to the invention in order to produce a foam structure under suitable operating conditions.

In addition to the above mentioned other additives, other polymeric materials can be blended with the blend compositions of this invention.

THE EXAMPLES

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

In the following examples, blends were prepared of the following polymer components:

VINYL POLYMER A

In a 5 gallon stainless steel reactor equipped with a helical uppumping agitator, was charged 4 pounds of a commercially pelletized blend of polyolefins containing approximately 85 weight percent of an EPDM elastomer having a molar ratio of ethylene to propylene of about 72 percent to 28 percent, and 3 double bonds of unsaturation as 1,4-hexadiene per 1,000 carbon to carbon bonds (db/1,000 C—C) of approximatly 170,000 weight average molecular weight with about 15 weight percent high density polyethylene. The particle size of the pelletized blend was about 3 mm in diameter by 1.5 mm in thickness. The vessel was pressurized with nitrogen to 180 psig and evacuated. Nine ml of a solution of 0.5 ml of a 75% solution of the t-butyl peroxy neodecanoate in mineral spirits (free radical initiator) and 12 pounds of vinyl chloride containing 5% isobutane÷were charged and the agitator was operated at 40 rpm and the jacket heated at 60° C. The pressure gradually increased to a maximum of 155 psig, and then fell. The reaction was allowed to proceed for 4 hours and then the unreacted monomer was recovered. Then 18 ml of a butyltin mercaptoacetate ester were added with 3 lb. of VCM. The mixture was heated and stirred for 20 minutes. The unreacted monomer was recovered. The product was degassed under vacuum at 80° C. for 2.5 hours. The yield of white pellets was 11.5 pounds with a calculated polyolefin content of 35%. It was estimated that the product contained at least 21% polyolefin in the grafted form.

VINYL POLYMER B

In a still larger preparation than used in preparing Vinyl Polymer A, 2,000 lbs. of the polyolefin used to make Vinyl Polymer A, were charged to a reactor and heated initially at 60° followed by cooling the jacket to maintain a maximum internal pressure of 150 psig. The reaction was carried out for 2.5 hrs. followed by degassing, etc. The recovered product 6,300 lb. has a calculated polyolefin content of 31.5%. The isolated product was 99+% in the form of free flowing pellets. Only small amounts of powder (0.5%) and agglomerated pellet and scale (0.3%) were observed in the product.

ASA POLYMER-I

A polymer of styrene and acrylonitrile and a chlorinated polyethylene, sold commercially as ACS-960 by the Showa Denko Company. The polymer had a number average molecular weight of about 38,000, a weight average molecular weight of about 120,000 and a ratio of weight to number average molecular weight of 3.22. The proportion of components was about 40 percent styrene, about 15 percent acrylonitrile and about 45 percent chlorinated polyethylene, all percentages by weight based on the weight of graft polymer.

ASA POLYMER-II

A polymer of styrene and acrylonitrile and acrylonitrile and acrylic rubber sold commercially as ASA-1,000 by Stauffer Chemical Company. This polymer has a number average molecular weight of about 45,000, a weight average molecular weight of about 130,000, and a ratio of weight to number average molecular weight of 2.87. The polymer contains about 56 percent styrene, about 15 percent acrylonitrile and about 29 percent acrylic rubber, all percentages by weight.

ASA POLYMER-III

A polymer of styrene, acrylonitrile and acrylic rubber sold commercially as VITAX-8,000 by Hitachi Chemical Company. The number average molecular weight is about 42,000, the weight average molecular weight is about 165,000 and the ratio of weight to number average molecular weight is 3.91. The polymer contains about 58 percent styrene monomer, about 23 percent acrylonitrile and about 19 percent acrylic rubber, all percentages by weight.

ASA POLYMER IV

A polymer of styrene, acrylonitrile and EPDM sold commercially as Rovel 700 by the Uniroyal Company. This polymer has a number average molecular weight of about 44,000, a weight average molecular weight of about 220,000, and a ratio of weight to number average molecular weight of 4.95. The polymer contains about 51 percent styrene, about 26 percent acrylonitrile and about 23 percent EPDM, all percentages by weight.

All polymers used in these examples were dried before preparing the blends. The blends were prepared on a two-roll Farrell mill heated using a hot oil system. A front roll temperature of 360° C. and a back roll temperature of 340° F. was used. The milling time was kept to a minimum necessary for obtaining good mixing, normally about 4 to 5 minutes. Due care was taken to obtain a good lateral mixing on the mill. The blend was removed from the mill in the form of a sheet and quickly cut into small pieces. These pieces were coarse ground after cooling. The injection molded tensile and flexural bars were used for evaluating mechanical properties. The injection molding of samples having appropriate ASTM configurations was carried out using an Arburg injection molding machine (Model 221E-150). Table 1 shows the details of the testing procedures used to obtain various properties.

TABLE 1

Summary of Testing and Characterization Methods

| Property/Data | ASTM Method | Instrument Used | Number of Samples | Type of Sample | Comments |
|---|---|---|---|---|---|
| Tensile Properties<br>Modulus<br>Strength (Yield)<br>Elongation (Yield) | D638 | Instron-<br>Model TTC | 5 | Injection Molded<br>Std dog bone shape<br>Tensile bar.<br>(⅛" × ½" 6½") | Strain rate of 0.2"/minute |
| Izod Impact<br>Room Temperature (23.3° C.)<br>or<br>Low Temperature (−28.8° C.) | D256 | Izod Impact<br>Tester | 3 | Injection Molded<br>Flex Bars<br>(¼" × ½" × 5") | Three bars tested at both sprue and vent ends. All samples were notched using standard size. |
| Specific Gravity | D792 | Standard<br>Balance | 2 | Injection Molded<br>Bar | Calculated from weight loss of the sample after immersing in distilled water. |
| Heat Distortion<br>Temperature | D648 | Standard Heat<br>Deflection<br>Bath | 2 | Injection Molded<br>Flex Bar<br>(¼" × ½"/5") | Tested at 264 psi. Sample immersed in silicone. Bath heated at 2° C./min. Sample bar tested edgewise. Two different conditioning methods used for each composition:<br>(a) 48 hours at 50° C.<br>(b) 24 hours at 70° C. |
| Flexural Properties<br>Modulus<br>Strength (Yield)<br>Strain (Yield) | D790 | Instron<br>Model-TMS | 5 | Injection Molded<br>Flexural Bar<br>(¼" × ½" × 5") | Cross head speed of 0.5" per minute |

EXAMPLES 1-5

Blends of various proportions of Vinyl Polymer B and ASA Polymer I were prepared as indicated in Table 2 using the above described blending procedures. The blends and individual components were tested according to the procedures listed in Table 1, and the results are shown in Table 2.

EXAMPLES 16-20

TABLE 2

| EXAMPLE NUMBER | WEIGHT RATIO OF ASA POLYMER I TO VINYL POLYMER B | NOTCHED IZOD IMPACT STRENGTH AT 23.3° C. FT-LB/IN | −28.8° C. | ANNEALED HEAT DISTORTION TEMPERATURE (264 psi) 48 HRS. AT 50° C. (24 HRS. AT 70° C.) °C. | |
|---|---|---|---|---|---|
| 1 | 100:0 | 2.8 | 0.43 | 80 | (88) |
| 2 | 90:10 | 9.0 | 0.61 | 77 | (86) |
| 3 | 80:20 | 12.6 | 0.92 | 76 | (85) |
| 4 | 70:30 | 16.0 | 0.87 | 75 | (84) |
| 5 | 60:40 | 18.1 | 1.16 | 74 | (82) |

EXAMPLES 6-10

Blends of various proportions of Vinyl Polymer B and ASA Polymer II were prepared as indicated in Table 3 using the above described blending procedures. The blends and individual components were tested Blends of various proportions of Vinyl Polymer B and ASA Polymer IV were prepared as indicated in Table 4 using the above described blending procedures. The blends and individual components were tested according to the procedures listed in Table 1, and the results are shown in Table 5.

TABLE 5

| EXAMPLE NUMBER | WEIGHT RATIO OF ASA POLYMER IV TO VINYL POLYMER B | NOTCHED IZOD IMPACT STRENGTH AT 23.3° C. FT-LB/IN | −28.8° C. | ANNEALED HEAT DISTORTION TEMPERATURE (264 psi) 48 HRS. AT 50° C. (24 HRS. AT 70° C.) °C. | |
|---|---|---|---|---|---|
| 16 | 100:0 | 8.6 | 1.65 | 83 | (92) |
| 17 | 90:10 | 12.8 | 1.89 | 81 | (90) |
| 18 | 80:20 | 15.0 | 2.39 | 80 | (89) |
| 19 | 70:30 | 16.3 | 2.55 | 78 | (87) |
| 20 | 60:40 | 17.0 | 4.55 | 76 | (84) | according to the procedures listed in Table 1, and the results are shown in Table 3.

EXAMPLES 21-24

TABLE 3

| EXAMPLE NUMBER | WEIGHT RATIO OF ASA POLYMER II TO VINYL POLYMER B | NOTCHED IZOD IMPACT STRENGTH AT 23.3° C. FT-LB/IN | −28.8° C. | ANNEALED HEAT DISTORTION TEMPERATURE (264 psi) 48 HRS. AT 50° C. (24 HRS. AT 70° C.) °C. | |
|---|---|---|---|---|---|
| 6 | 100:0 | 6.0 | 0.39 | 81 | (90) |
| 7 | 90:10 | 9.4 | 0.62 | 78 | (88) |
| 8 | 80:20 | 14.2 | 0.71 | 77 | (87) |
| 9 | 70:30 | 15.0 | 0.78 | 75 | (85) |
| 10 | 60:40 | 16.1 | 1.52 | 74 | (83) |

EXAMPLES 11-15

Blends of various proportions of Vinyl Polymer B and ASA Polymer III were prepared as indicated in Table 4 using the above described blending procedures. The blends and individual components were tested according to the procedures listed in Table 1, and the results are shown in Table 4.

Blends of various proportions of a commercial injection molding grade of PVC resin sold by Occidental Chemical Corporation under the name B-221, Vinyl Polymer B and ASA Polymer I were blended as shown in Table 6 using the above described blending procedures. The weight ratio of PVC to Vinyl Polymer B was 60 to 40. The blends were tested according to the procedures in Table 1 and the results are reported in

TABLE 4

| EXAMPLE NUMBER | WEIGHT RATIO OF ASA POLYMER III TO VINYL POLYMER B | NOTCHED IZOD IMPACT STRENGTH AT 23.3° C. FT-LB/IN | −28.8° C. | ANNEALED HEAT DISTORTION TEMPERATURE (264 psi) 48 HRS. AT 50° C. (24 HRS. AT 70° C.) °C. | |
|---|---|---|---|---|---|
| 11 | 100:0 | 2.4 | 0.48 | 92 | (99) |
| 12 | 90:10 | 3.0 | 0.37 | 88 | (96) |
| 13 | 80:20 | 6.6 | 0.6 | 85 | (94) |
| 14 | 70:30 | 12.4 | 0.65 | 82 | |
| 15 | 60:40 | 14.1 | 1.17 | 80 | |

Table 6.

TABLE 6

| EXAMPLE NUMBER | WEIGHT RATIO OF VINYL POLYMER* TO ASA POLYMER I | NOTCHED IZOD IMPACT STRENGTH AT 23.3° C. FT-LB/IN | −28.2° C. | ANNEALED HEAT DISTORTION TEMPERATURE (264 psi) 48 HRS. AT 50° C. (24 HRS. AT 70° C.) °C. | |
|---|---|---|---|---|---|
| 21 | 80:20 | 21.3 | 1.0 | 71 | (74) |
| 22 | 60:40 | 14.9 | 0.98 | 72 | (78) |

TABLE 6-continued

| EXAMPLE NUMBER | WEIGHT RATIO OF VINYL POLYMER* TO ASA POLYMER I | NOTCHED IZOD IMPACT STRENGTH AT 23.3° C. FT-LB/IN | −28.2° C. | ANNEALED HEAT DISTORTION TEMPERATURE (264 psi) 48 HRS. AT 50° C. (24 HRS. AT 70° C.) °C. |
|---|---|---|---|---|
| 23 | 40:60 | 10.0 | 0.77 | 74 (81) |
| 24 | 20:80 | 8.4 | 0.77 | 76 (84) |

*Weight ratio of PVC to Vinyl Polymer B = 60:40

EXAMPLES 25–28

Blends of various proportions of a commercial PVC resin sold by Occidental Chemical Corporation under the name B-221, Vinyl Polymer B and ASA Polymer II were blended as shown in Table 7 using the above described blending procedures. The weight ratio of PVC to Vinyl Polymer B was 60 to 40. The blends were tested according to the procedures in Table 1 and the results are reported in Table 7.

TABLE 7

| EXAMPLE NUMBER | WEIGHT RATIO OF VINYL POLYMER* TO ASA POLYMER II | NOTCHED IZOD IMPACT STRENGTH AT 23.3° C. FT-LB/IN | −28.2° C. | ANNEALED HEAT DISTORTION TEMPERATURE (264 psi) 48 HRS. AT 50° C. (24 HRS. AT 70° C.) °C. |
|---|---|---|---|---|
| 25 | 80:20 | 23.5 | 1.0 | 71 (76) |
| 26 | 60:40 | 21.0 | 0.92 | 72 (79) |
| 23 | 40:60 | 17.2 | 0.61 | 75 (83) |
| 24 | 20:80 | 12.0 | 0.54 | 76 (86) |

*Weight ratio of PVC to Vinyl Polymer B = 60:40

EXAMPLES 29–32

Blends of various proportions of a commercial PVC resin sold by Occidental Chemical Corporation under the name B-221, Vinyl Polymer B and ASA Polymer III were blended as shown in Table 8 using the above described blending procedures. The weight ratio of PVC to Vinyl Polymer B was 60 to 40. The blends were tested according to the procedures in Table 1 and the results are reported in Table 8.

TABLE 8

| EXAMPLE NUMBER | WEIGHT RATIO OF VINYL POLYMER* TO ASA POLYMER III | NOTCHED IZOD IMPACT STRENGTH AT 23.3° C. FT-LB/IN | −28.8° C. | ANNEALED HEAT DISTORTION TEMPERATURE (264 psi) 48 HRS. AT 50° C. (24 HRS. AT 70° C.) °C. |
|---|---|---|---|---|
| 29 | 80:20 | 20.8 | 0.8 | 72 (80) |
| 30 | 60:40 | 18.7 | 0.98 | 75 (84) |
| 31 | 40:60 | 10.2 | 0.84 | 79 (87) |
| 32 | 20:80 | 4.8 | 0.57 | 85 (92) |

*Weight ratio of PVC to Vinyl Polymer B = 60:40

EXAMPLES 33–36

Blends of various proportions of a commercial PVC resin sold by Occidental Chemical Corporation under the name B-221, Vinyl Polymer B and ASA Polymer IV were blended as shown in Table 9 using the above described blending procedures. The weight ratio of PVC to Vinyl Polymer B was 60 to 40. The blends were tested according to the procedures in Table 1 and the results are reported in Table 9.

TABLE 9

| EXAMPLE NUMBER | WEIGHT RATIO OF VINYL POLYMER* TO ASA POLYMER IV | NOTCHED IZOD IMPACT STRENGTH AT 23.3° C. FT-LB/IN | −28.8° C. | ANNEALED HEAT DISTORTION TEMPERATURE (264 psi) 48 HRS. AT 50° C. (24 HRS. AT 70° C.) °C. |
|---|---|---|---|---|
| 33 | 80:20 | 21.6 | 1.28 | 70 (74) |
| 34 | 60:40 | 17.4 | 1.84 | 72 (79) |
| 35 | 40:60 | 12.6 | 1.12 | 76 (84) |
| 36 | 20:80 | 9.4 | 1.43 | 80 (89) |

*Weight ratio of PVC to Vinyl Polymer B = 60:40

EXAMPLE 37

ASA Polymer I was blended with Vinyl Polymer B and B-221 PVC resin made by Occidental Chemical Corporation. The proportions of these polymers are shown in Table 10. This blend composition was tested for different properties according to the procedures described in Table 1. The results are shown in Table 10.

EXAMPLE 38

ASA Polymer III was blended with B-221 PVC resin (made by Occidental Chemical Corporation) and Vinyl Polymer B. The proportions of these polymer components are shown in Table 10. The properties of this blend were measured according to previously described procedures in Table 1, and are listed in Table 10.

EXAMPLE 39

A blend of B-221 PVC resin (Occidental Chemical Corporation), Vinyl Polymer B and ASA Polymer IV was prepared using a procedure described earlier. The proportions of various components are listed in Table 10, along with the properties of the blend which were measured according to procedures described in Table 1.

TABLE 10

|  | Example No.: | | |
|---|---|---|---|
|  | 37 | 38 | 39 |
|  | *Vinyl Polymers: | | |
|  | *Vinyl Polymer ASA Polymer I (60:40) | *Vinyl Polymer ASA Polymer III (50:50) | *Vinyl Polymer ASA Polymer IV (40:60) |
| Mechanical Properties | | | |
| Tensile Strength psi × $10^{-3}$ | 5.42 | 6.23 | 5.54 |
| Tensile Modulus psi × $10^{-5}$ | 3.1 | 3.38 | 3.24 |
| Elongation % | 3.07 | 3.56 | 2.92 |
| Notched Izod Impact @ 23.3° C. | 15.6 | 14.0 | 13.9 |
| Notched Izod Impact @ −28.8° C. | 0.66 | 0.73 | 1.65 |
| Flexural Strength psi × $10^{-3}$ | 9.48 | 11.4 | 9.94 |
| Flexural Modulus psi × $10^{-5}$ | 3.2 | 3.65 | 3.30 |
| Percent Strain | 4.58 | 4.8 | 4.59 |
| Rockwell Hardness | R-89 | R-94 | R-85 |
| Shore Durometer Hardness | D-76 | D-76 | D-76 |
| Specific Gravity | 1.23 | 1.17 | 1.12 |
| Mold Shrinkage inch/inch | 0.0034 | 0.004 | 0.0016 |
| Thermal Properties | | | |
| Heat Distortion Temperature (264 psi) | 72 | 77 | 75 |
| Heat Distortion Temperature (annealed) | 79 | 86 | 84 |
| UL-94 Rating ⅛" | V-O | N-C | NC |
| 1/16" | V-O | N-C | NC |
| Brabender Torque Rheometer Data | | | |
| Fusion Time (seconds) | 13 | 12.8 | 18.2 |
| Maximum Fusion Torque (meter-grams) | 3460 | 4480 | >6000 |
| Equilibrium Torque (meter-grams) | 780 | 1240 | 1160 |
| Decomposition Time (minutes) | 13.1 | 5.3 | 9.1 |

*Weight ratio of PVC to Vinyl Polymer B = 60:40.

EXAMPLES 40–43

Blends of Vinyl Polymer B and ASA Polymer IV were prepared in different proportions indicated in Table 11. 55-gram samples of these blends were tested in a Brabender Torque Rheometer. The results of these tests are shown in Table 11.

TABLE 11

Brabender Torque Rheometer Data

|  | Example No. | | | |
|---|---|---|---|---|
|  | 40 | 41 | 42 | 43 |
| Vinyl Polymer B:ASA Polymer IV | 10:90 | 20:80 | 30:70 | 40:60 |
| Ram Pressure, grams | 7500 | 7500 | 7500 | 7500 |
| R.P.M. | 63 | 63 | 63 | 63 |
| Max Fusion Peak (seconds) | 16.4 | 21.2 | 18.0 | 16.8 |
| Max Fusion Torque (meter-grams) | 5250 | 6300 | 5000 | 4250 |
| Equilibrium Torque (meter-grams) | 1250 | 1400 | 1350 | 1350 |
| Decomposition | >30 | >30 | 27.3 | 25.0 |
| Stock Held @ (°F.) | 400 | 400 | 400 | 400 |

The foregoing examples illustrate that the blends of various ASA polymers with the polyolefin graft polymers possess excellent notched impact strengths and high heat distortion temperatures. Also, the blends of the vinyl halide polymer, the polyolefin graft polymer and various ASA polymers have high impact strengths and enhanced heat distortion temperatures. These blends also have good mechanical properties.

We claim:

1. A polymer composition comprising:
   a polymer of a vinyl aromatic compound, an unsaturated nitrile and a base polymer selected from the group consisting of chlorinated polyethylene, an acrylic polymer, and an ethylene, propylene polyene modified polymer, and
   a vinyl halide polyolefin graft polymer wherein the vinyl halide alone or in combination with up to 50 percent by weight based on the total weight of monomer of an ethylenically unsaturated compound copolymerizable therewith, and in the liquid state, is polymerized with a polyolefin which comprises a polymer of an aliphatic hydrocarbon monoolefin of 2 to about 8 carbon atoms, and which is in the solid state and is substantially insoluble in the monomer but absorbs a substantial amount of the monomer.

2. The polymer composition of claim 1 wherein the vinyl halide is vinyl chloride.

3. The polymer composition of claim 2 wherein the base polymer is chlorinated polyethylene.

4. The polymer composition of claim 2 wherein the base polymer is an acrylic rubber.

5. The polymer composition of claim 2 wherein the base polymer is an ethylene, propylene polyene modified polymer.

6. A polymer composition comprising a polymer of styrene, acrylonitrile and chlorinated polyethylene, and
   a vinyl chloride polyolefin graft polymer, wherein the vinyl chloride in the liquid state, is polymerized with a polyolefin which is in the solid state and comprises an ethylene, propylene diene modified polymer that is substantially insoluble in vinyl chloride but absorbs a substantial amount of chloride,
   wherein the proportion of polyolefin in said graft polymer is greater than about 20 up to about 80 weight percent based on the weight of vinyl chloride.

7. The polymer composition of claim 6 wherein the polyolefin comprises a mixture of an ethylene propylene diene modified polymer and a high density polyethylene.

8. The polymer composition of claim 7 wherein the polyolefin is present in a proportion of about 30 to 50 percent by weight.

9. The polymer composition of claim 6 wherein the vinyl chloride graft polymer is present in a proportion of about 40 to about 60 weight percent based on the weight of the polymer components.

10. The polymer compositon of claim 6 which also comprises polyvinyl chloride.

11. The polymer composition of claim 10 wherein the polymer of styrene, acrylonitrile and chlorinated polyethylene is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

12. A polymer composition comprising:
   a polymer of styrene, acrylonitrile and an acrylic polymer, and
   a vinyl chloride polyolefin graft polymer, wherein the vinyl chloride in the liquid state, is polymerized with a polyolefin which is in the solid state and comprises an ethylene propylene diene modified polymer that is substantially insoluble in vinyl chloride but absorbs a substantial amount of vinyl chloride,
   wherein the proportion of polyolefin in said graft polymer is greater than about 20 up to about 80 weight percent based on the weight of vinyl chloride.

13. The polymer composition of claim 12 wherein the polyolefin comprises a mixture of ethylene, propylene diene modified polymer and a high density polyethylene.

14. The polymer composition of claim 13 wherein the polyolefin is present in a proportion of about 30 to 50 percent by weight.

15. The polymer composition of claim 14 wherein the vinyl chloride graft polymer is present in a proportion of about 40 to 60 weight percent based on the weight of the polymer components.

16. The polymer composition of claim 12 which also comprises polyvinyl chloride.

17. The polymer composition of claim 16 wherein the polymer of styrene, acrylonitrile and acrylic polymer is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

18. The polymer composition of claim 17 wherein the acrylic polymer comprises a graft polymer of 10 to 40 percent of (A) a polymer of (1) 0.1 to 10 percent by weight of a polyalkyl compound, (2) 60 to 99.9 percent by weight of at least one alkyl acrylate and (3) 0 to 30 percent by weight of at least one vinyl or vinylidene compound polymerizable with (2), and 90 to 60 percent by weight of a monomer mixture comprising 30 to 100 percent by weight of an aromatic vinyl monomer and 0 to 70 percent by weight of acrylonitrile and methyl methacrylate in which the proportion of acrylonitrile is 20 to 100 percent by weight and the proportion of methyl methacrylate is 20 to 100 percent by weight.

19. A polymer composition comprising:
   a polymer of styrene, acrylonitrile and an ethylene, propylene polyene modified polymer, and
   a vinyl chloride polyolefin graft polymer, wherein the vinyl chloride in the liquid state, is polymerized with a polyolefin which is in the solid state and comprises an ethylene propylene diene modified polymer that is substantially insoluble in vinyl chloride but absorbs a substantial amount of vinyl chloride,
   wherein the proportion of polyolefin in said graft polymer is greater than about 20 up to about 80 weight percent based on the weight of vinyl chloride.

20. The polymer composition of claim 19 wherein the polyolefin comprises a mixture of an ethylene, propylene diene modified polymer and a high density polyethylene.

21. The polymer composition of claim 20 wherein the polyolefin is present in a proportion of about 30 to 50 percent by weight.

22. The polymer composition of claim 21 wherein the vinyl chloride polymer is present in a proportion of about 40 to about 60 weight percent based on the weight of the polymer components.

23. The polymer composition of claim 19 which also comprises polyvinyl chloride.

24. The polymer composition of claim 23 wherein the polymer of styrene, acrylonitrile and the ethylene, propylene polyene modified polymer is present in a proportion of about 20 to about 80 weight percent based on the weight of total polymer components, and the polyolefin graft polymer and polyvinyl chloride are present in a ratio of about 10 parts polyolefin graft polymer to 90 parts polyvinyl chloride to about 90 parts polyolefin graft polymer to 10 parts polyvinyl chloride.

* * * * *